United States Patent
Andreoli

(10) Patent No.: US 7,637,368 B2
(45) Date of Patent: Dec. 29, 2009

(54) GUIDE FOR CONVEYOR OF ARTICLES

(75) Inventor: Andrea Andreoli, Modena (IT)

(73) Assignee: Rexnord Marbett S.r.l., Correggio (Reggio Emilia) (IT)

( * ) Notice: Subject to any disclaimer, the term of this patent is extended or adjusted under 35 U.S.C. 154(b) by 0 days.

(21) Appl. No.: 12/035,272

(22) Filed: Feb. 21, 2008

(65) Prior Publication Data

US 2008/0197000 A1 Aug. 21, 2008

(30) Foreign Application Priority Data

Feb. 21, 2007 (IT) .......................... MI2007A0333
Feb. 21, 2007 (IT) .......................... MI2007A0334

(51) Int. Cl.
   *B65G 21/20* (2006.01)
(52) U.S. Cl. .............. 198/836.3; 198/836.1; 198/836.4; 193/35 C
(58) Field of Classification Search .............. 198/836.1, 198/836.3, 836.4, 861.2; 193/35 C, 35 R
   See application file for complete search history.

(56) References Cited

U.S. PATENT DOCUMENTS

| | | | |
|---|---|---|---|
| 3,094,206 A | | 6/1963 | Stewart et al. |
| 3,237,754 A | | 3/1966 | Freitag, Jr., et al. |
| 3,934,706 A | * | 1/1976 | Tice ............................ 198/454 |
| 4,164,283 A | | 8/1979 | Flajnik |
| 4,227,610 A | | 10/1980 | Gerdes et al. |
| 4,958,725 A | | 9/1990 | Meade et al. |
| 4,962,843 A | * | 10/1990 | Ouellette ...................... 198/453 |
| D325,277 S | * | 4/1992 | Abbestam et al. ............. D34/35 |
| 5,143,200 A | * | 9/1992 | Fuller ........................... 198/453 |
| 5,311,979 A | * | 5/1994 | Risley et al. ................. 198/453 |
| 5,601,180 A | * | 2/1997 | Steeber et al. ........... 198/502.1 |
| 5,803,687 A | | 9/1998 | Ledingham |
| 5,911,306 A | * | 6/1999 | Ferrari ...................... 198/836.1 |
| 6,076,655 A | * | 6/2000 | Marsetti ...................... 198/445 |
| 6,129,202 A | | 10/2000 | Layne et al. |
| 6,196,375 B1 | * | 3/2001 | Cozza ...................... 198/836.1 |
| 6,386,355 B1 | | 5/2002 | Willems |
| 6,598,729 B2 | * | 7/2003 | Marsetti et al. ............. 198/452 |
| 6,991,086 B2 | * | 1/2006 | Ledingham ................. 198/454 |
| 7,380,378 B2 | * | 6/2008 | Clifford et al. ........... 52/204.72 |
| 2005/0011728 A1 | | 1/2005 | Ledingham |

FOREIGN PATENT DOCUMENTS

| | | |
|---|---|---|
| DE | 101 18 566 A1 | 10/2002 |
| EP | 1 905 708 A | 4/2008 |
| WO | 2006120354 A1 | 11/2006 |

OTHER PUBLICATIONS

US PG Pub 2008/0073183 by Andreoli filed Mar. 27, 2008.*

* cited by examiner

*Primary Examiner*—Douglas A Hess
(74) *Attorney, Agent, or Firm*—Quarles & Brady LLP

(57) ABSTRACT

A guide for a conveyor of articles includes a guide element elongated in a longitudinal direction. The guide element includes a substantially planar portion and first and second edges opposed to each other in a transversal direction, transversal to said longitudinal direction. A clamp associable with the guide element includes a back portion and two clamp appendixes opposed to each other in the transversal direction and is adapted to clamp the guide element along the first and second edges. The clamp is tightened to exert an action of traction on the appendixes of the clamp to urge them one towards the other in said first transversal direction, so as to tighten said clamp appendixes against said first and second edges of the guide element.

21 Claims, 5 Drawing Sheets

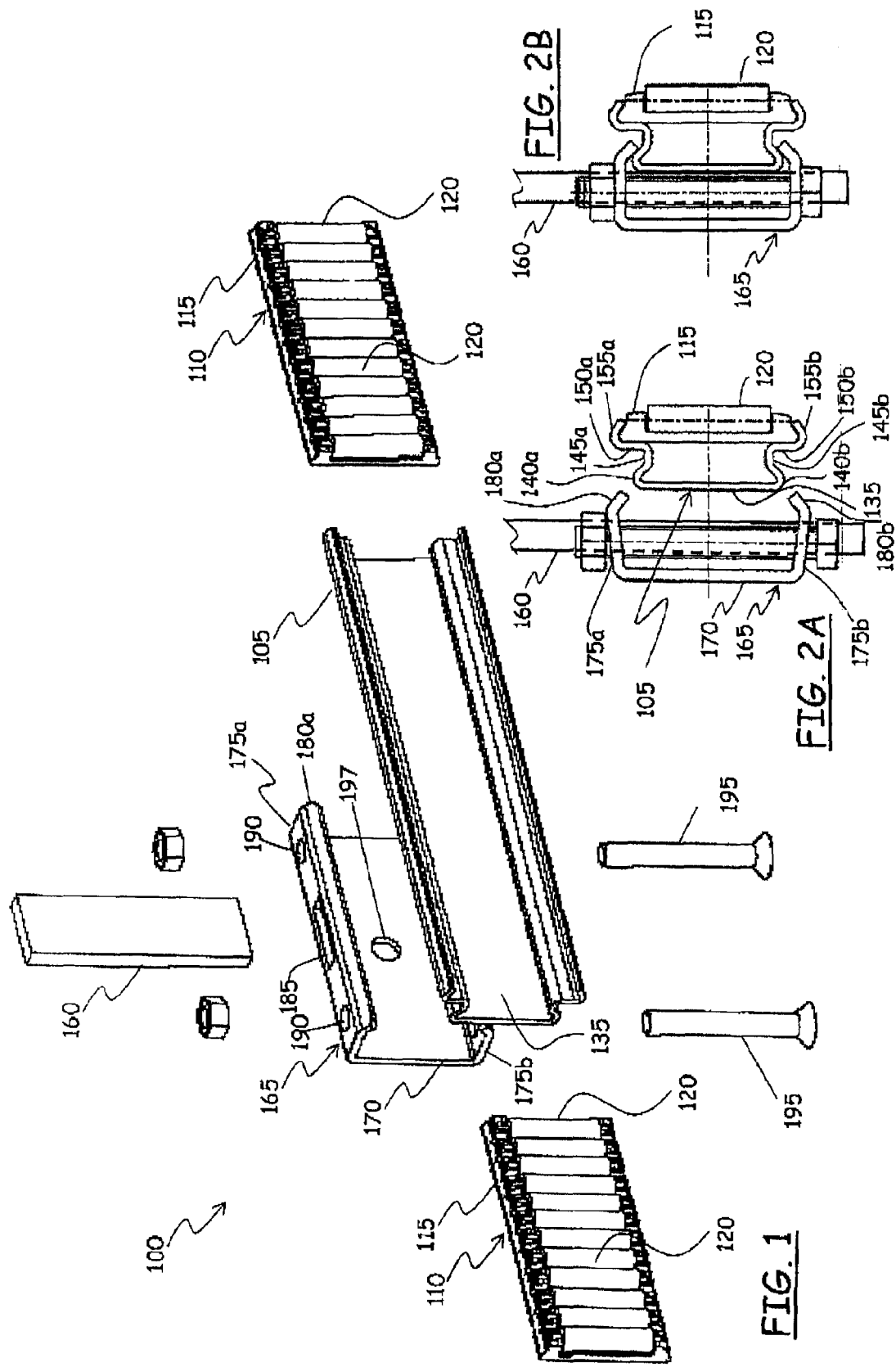

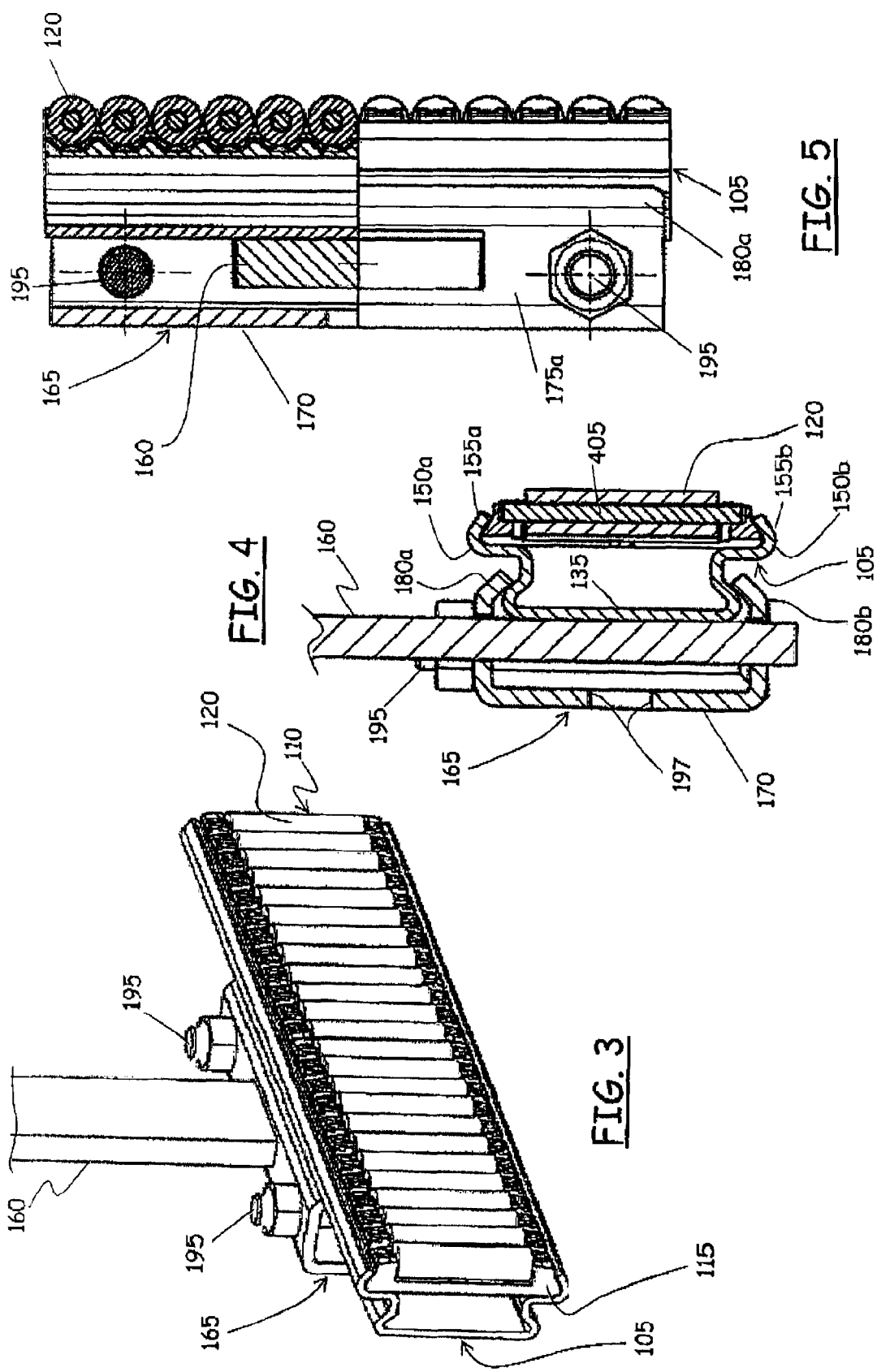

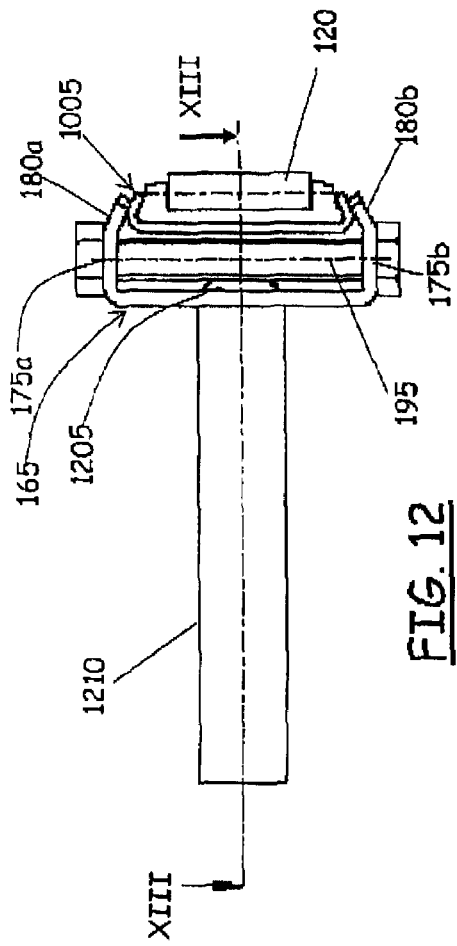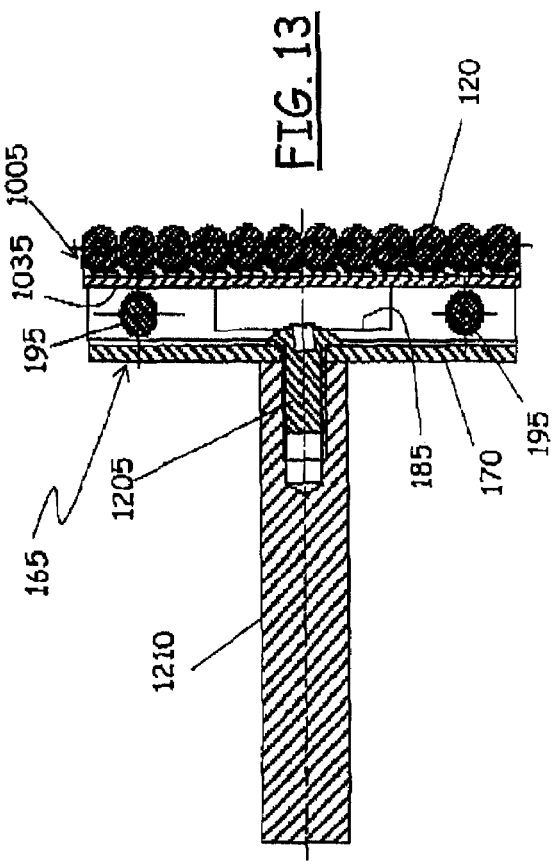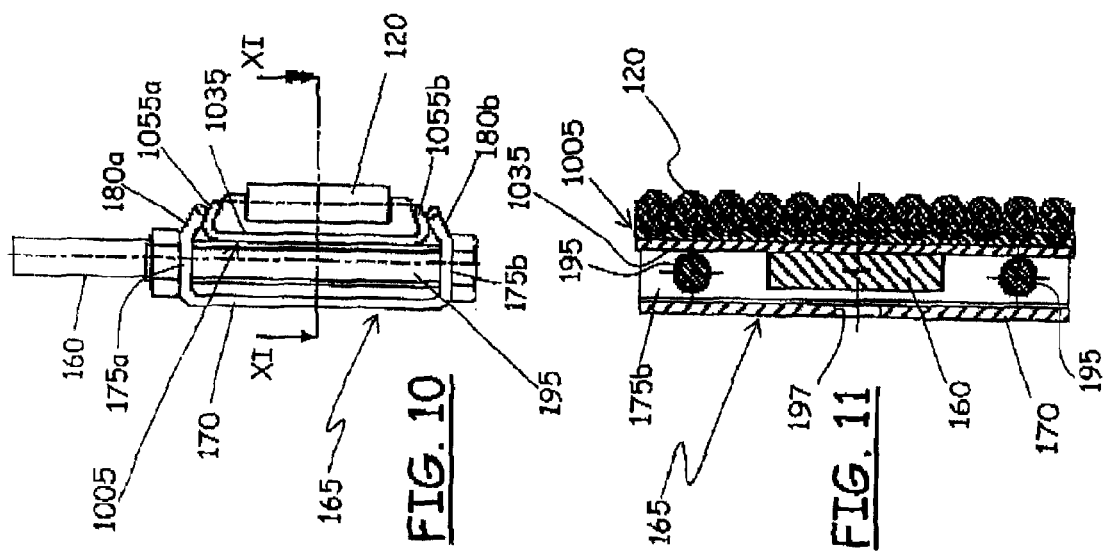

GUIDE FOR CONVEYOR OF ARTICLES

CROSS REFERENCES TO RELATED APPLICATIONS

This application claims the priority benefit of Italian Patent application Nos. MI2007A000333 and MI2007A000334, both filed on Feb. 21, 2007, and which are fully incorporated herein by reference.

STATEMENT REGARDING FEDERALLY SPONSORED RESEARCH

Not Applicable.

FIELD OF INVENTION

The present invention relates in general to the field of the conveyors of articles, such as for instance belt conveyors and chain conveyors, for example, although not exclusively, of the type used for transporting bottled drinks and similar articles. The invention more particularly relates to the guides used in the above-mentioned conveyors of articles for the containment and the routing of the transported articles, and to the aspects related to the mounting of such guides to the conveyors' frames.

BACKGROUND OF INVENTION

In article conveyors, the use of guides is known to ensure the containment and the proper routing of the transported articles. Such guides are in particular necessary in correspondence of curved sections and bifurcations of the transport line or path, for instance in correspondence of accumulation stations, where a single flow of transported articles needs to be separated into two or more distinct flows, for instance to prepare the articles to the packaging and packing.

Roller guides are very commonly used, in which for the engagement with the transported articles idle rolling elements are foreseen, typically arrays of idle rollers. Another type of guides, that could be defined as "static", does not have roller elements, and longitudinally elongated bars or tubular elements or profiled members in various materials, for instance in steel or plastics, are provided for the contact with the transported articles. The roller guides are generally preferred to the static guides, since, differently from the latter, they substantially allow a frictionless contact with the transported articles, and this avoids possible decelerations, possible jams or falls of the transported articles or superficial damages (for instance, small abrasions).

Typically, the guides are mounted, by means of clamps, to respective support bars, that extend vertically and are in turn attached to the frame of the conveyor. A problem that affects the guides for conveyors of articles is represented by the twisting that they may suffer in consequence of the side stresses, transversal to the direction along which the transport path extends, that in use are exerted onto them by the transported articles. Such stresses can cause an undesired side bending, that prevent the proper working of the conveyor. It is therefore important to guarantee a suitable rigidity of the guides, particularly to withstand the transversal stresses without getting deformed.

Additionally, the operations of mounting the guides to the frame of the conveyor on which they are to be installed should be as simple as possible without requiring the use of special tools.

SUMMARY OF THE INVENTION

In view of the state of the art outlined above, the Applicant has faced the problem of devising a guide assembly, and a related system for the mounting to the frame of a conveyor of articles, that features an improved resistance to bending.

According to an aspect of the present invention, a guide is provided including a guide element elongated in a longitudinal direction and intended in use to be arranged along a transport path of a conveyor of articles for the containment and/or the routing of the transported articles. The guide element includes a substantially planar portion and first and second edges opposed to each other in a first transversal direction transversal to said longitudinal direction. A clamp associable to the guide element includes a back portion and two clamp appendixes opposed to each other in the first transversal direction and adapted to clamp the guide element along the first and second edges. The clamp is adapted to the coupling to a support bar of the conveyor of articles intended to support the guide element to a frame of the conveyor. Tightening means associable to the clamp and actuatable to exert an action of traction of the clamp appendixes to urge them one towards the other in the first transversal direction, so as to tighten the clamp appendixes against the first and second edges of the guide element. The clamp appendixes of the clamp and the first and second edges of the guide element are shaped in such way as to transform at least partly the action of traction exerted by the tightening means on the clamp appendixes into an action of urging of the guide element toward the back portion of the clamp. The action of urging is adapted to bring the planar portion of the guide element in abutment against at least one among the support bar or the tightening means.

BRIEF DESCRIPTION OF THE DRAWINGS

The features and advantages of the present invention will be made apparent by the following detailed description of some practical embodiments thereof, provided merely by way of non-limitative examples, description that will be conducted with the aid of the attached drawings, wherein:

FIG. 1 is a view in exploded axonometry of a portion of a guide for conveyor of articles, particularly a roller guides, according to a first embodiment of the present invention;

FIGS. 2A and 2B are elevation views from the left of the guide of FIG. 1, before and after mounting it to a vertical support bar attached to the frame of a conveyor of articles;

FIG. 3 shows, still in axonometry but assembled, the guide of FIG. 1, mounted to the support bar;

FIG. 4 is a sectional view along a plane transversal to the guide of FIG. 3, in the middle of the support bar;

FIG. 5 shows the guide of FIG. 2, partially from above and partially in cross-section on a longitudinal plane passing through the middle of the guide itself;

FIG. 10 shows, in a view similar to those of FIGS. 2A, 2B, 6 and 8, a guide according to a second embodiment of the present invention;

FIG. 11 is a sectional view according to the plane XI-XI of FIG. 10;

FIG. 12 shows the guide in accordance with the second embodiment of the present invention in a view similar to that of FIG. 10, but mounted to a support bar extending horizontally; and FIG. 13 is a sectional view according to the plane XIII-XIII of FIG. 12.

DETAILED DESCRIPTION OF THE PREFERRED EMBODIMENTS

Figure 6:
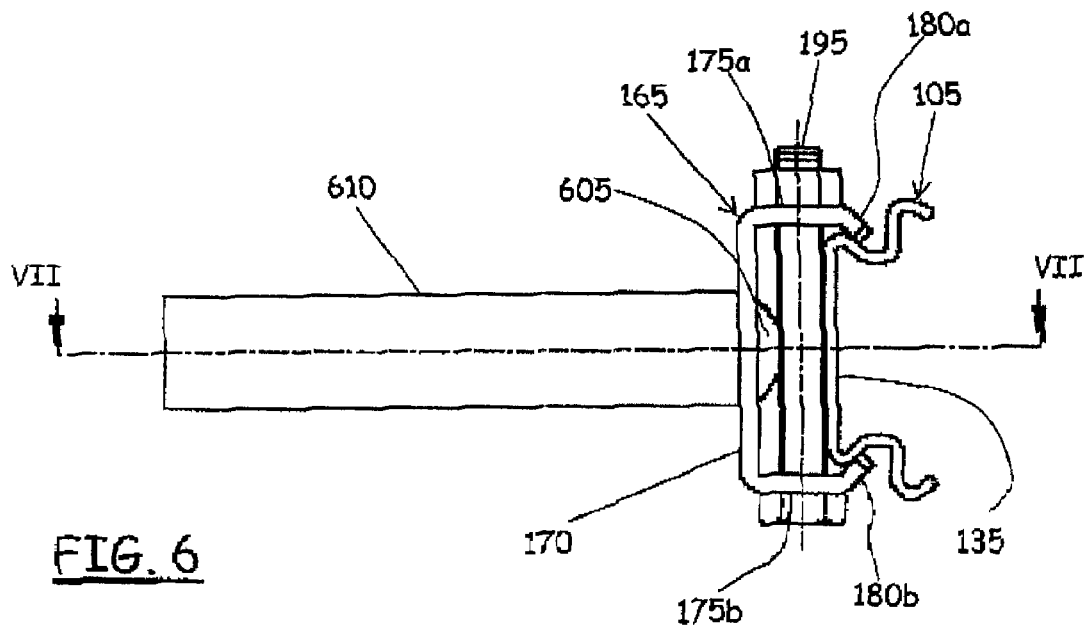
FIG. 6 shows the guide according to the first embodiment of the present invention, in a view similar to those of FIGS. 2A and 2B, but mounted to a support bar extending horizontally.

Making reference to the drawings, and particularly to FIGS. 1 to 7, there is shown in various views (exploded axonometry, axonometry after the assemblage, lateral view, top-plan view and sectional views according to transversal and longitudinal planes, respectively) a portion (segment) of a guide for a conveyor of articles according to a first embodiment of the present invention, particularly a roller guide adapted to be used in a conveyor of articles as a guide for of containment/routing of the transported articles along a transport path.

The guide can advantageously be employed in any type of conveyor known in the art, for example a chain or a belt conveyor, for the transport of articles like, for instance, bottles for drinks, made of glass or in plastics, or jars or vases of preserves, and similar. The specific type of conveyor, and the nature of the articles that the conveyor is intended to transport, are not to be considered limitative for the present invention.

The (portion of) guide of the exemplary embodiment here considered, identified globally with the reference numeral 100, comprises a support element 105 extended longitudinally, for instance formed by a profiled element, of any suitable material. Particularly, the support element 105 can be in metal, for instance in aluminum or steel or other suitable material, to confer a suitable degree of rigidity to the guide 100, and it can be obtained by extrusion or lamination; the particular material, and the fabrication technique adopted for realizing the support element 105 are however not limitative for the present invention. Preferably, the support element 105, that can be provided in segments of various lengths, for instance of some meters, is also plastically deformable, for instance by means of rolling operations, so as to result adaptable also to curved portions of the articles transport path.

The support element 105 is adapted to support one or more idle rollers modules 110, arranged in longitudinal succession to form a queue, essentially without discontinuity; the idle rollers modules 110 form the part of the guide intended in use to be engaged by the transported articles. The generic idle rollers module 110 includes a roller-carrying frame 115, provided with a plurality of housings for the rollers, arranged in longitudinal succession. The roller-carrying frame 115 can be for instance realized in plastic material, for example acetalic resin.

Each housing for the rollers is adapted to accommodate a respective roller, that, in the example here considered and shown, comprises a cylinder 120 mounted in a freely rotatable way (idle) on a respective stem 405 (visible in FIG. 4) whose ends protrude with respect to the cylinder 120. The cylinders 120 can be for instance realized in plastic material, particularly but not limitatively polyethylene, acetalic resin or polyamide; the stems 405 of the cylinders 120 can in turn be made in steel or in plastic material, for instance of the same material as the roller-carrying frame 115. Each housing for the rollers includes, above and below, seats adapted to house by insertion, for example snap-fit, the ends of the stem 405 that protrude from the respective cylinder 120.

The roller-carrying frame 115 is shaped in such way that, when the rollers are inserted into the respective housings, the cylinders 120 are exposed on one side, and can freely rotate around the axes of the respective stems 405. The use of rollers in which the roller elements are formed by cylinders is however not to be considered limitative: in alternative embodiments of the invention, the rollers can have different shapes, for instance each of them may comprise two or more spherical roller elements, inserted in a freely rotatable way on a stem.

In the herein considered embodiment of the invention, the support element 105 is in particularly shaped so as to have transversal section generically shaped as a "double C", with a substantially planar back wall 135, of prevailing extension, having upper and lower edges 140a 140b bent on the same side and preferably forming an acute angle compared to the plane in which the back wall 135 lies. Each one of the two edges 140a, 140b continues with a respective segment 145a, 145b substantially planar and lying in a plane generically perpendicular to the plane in which the back wall 135 lies, said segment 145a, 145b continuing to form a wall 150a, 150b lying in a plane substantially parallel to that in which the back wall 135 lies and which departs from the middle of the back wall 135; each one of the two walls 150a, 150b finally ends in a respective appendix 155a and 155b, bent, on the same side of the two edges 140a, 140b, toward the middle of the back wall 135. The support element 105 thus has, in correspondence of the back wall 135, a "swallowtail" profile, that forms a male coupling profile for the coupling to a mounting element of the guide to a frame of a conveyor of articles, as described later on.

The roller-carrying frame 115 of the generic idle rollers module 110 has dimensions such that it can be inserted, from one or the other of the two longitudinal ends of the support element 105, between the two bent appendixes 155a and 155b of the support element 105, with the rollers placed on the opposite side compared to the back wall 135 of the support element 105; once inserted, the roller-carrying frame 115 is retained by the bent appendixes 155a and 155b, against the surface of the walls 150a and 150b. The rollers 120 can also be mounted to the roller-carrying frame 115 of the generic idle rollers module 110 after the same has been inserted into the support element 105. The bent appendixes 155a and 155b form a female coupling profile for the coupling with the idle rollers modules, or in general with the elements of the guide intended in use to the contact with the transported articles.

In use, the support element 105 is adapted to be mounted to a support bar 160, intended in turn to be attached to a frame of the conveyor of articles on which the guide 100 is to be installed, so as to extend substantially vertically. In the shown example, the support bar 160, for instance realized in metal, has rectangular cross-section, however the specific shape of the support bar 160 is not to be considered limitative for the present invention, although in the herein considered embodiment it is preferable that the support bar 160 has at least a generically planar portion.

According to the embodiment of the present invention here considered, for the assemblage of the support element 105 to the support bar 160 a clamp 165 is provided, of such dimensions as to make it adapted to clamp longitudinal segments of the bent edges 145a and 145b of the support element 105. Particularly the clamp 165 is shaped generically as a "C", with a back wall 170 joined to two wings 175a and 175b bent on a same side and each ending with an appendix 180a, 180b further bent compared to the wings 175a and 175b.

The distance between the two wings 175a and 175b is slightly greater than the height of the back wall 135 of the support element 105, and the clamp 165 has, in transversal section, a profile generically complementary to the "swallowtail" profile of the support element 105.

The clamp 165 is preferably formed in a material of sufficient rigidity; in a rest condition, visible in FIG. 2A, the two wings 175a and 175b form with the plane in which the back wall 170 lies an angle sufficient to allow that the minimum distance between the two appendixes 180a, 180b (i.e., the gap between the two edges of the two appendixes 180a, 180b) is slightly greater than the height of the back wall 135 of the support element 105, to an extent sufficient to allow the back insertion of the support element 105 into the clamp 165, without the appendixes 180a, 180b interfering with the back wall 135; particularly, in the rest condition the angle that the two wings 175a and 175b form with the plane in which the back wall 170 lies is greater than 90°. The two appendixes 180a, 180b form, with the respective wings 175a and 175b, angles substantially complementary to those that the bent edges 140a, 140b of the support element 105 form with the back wall 135.

In each of the two wings 175a and 175b of the clamp 165, substantially in central position, a through slot 185 is formed, at the two sides of which through holes 190 are foreseen. The slots 185 have shape and size such as to allow the passage of the support bar 160; the holes 190 have diameter such as to allow the passage of the stems of two screws 195. Additionally, in the back wall 170 of the clamp 165, substantially in central position, a through hole 197 can be provided for, possibly threaded.

For the mounting of the guide 100, after having inserted into the support element 105 the desired number of idle rollers modules 110 (corresponding for instance to the longitudinal extension of the support element 105), the clamp 165 is inserted onto the bar 160, exploiting the two slots 185, and the support element 105 is then inserted from the back into the clamp 165 (FIG. 2A). Then, the screws 195 are inserted into the holes 190, and, by tightening the screws 195 using respective threaded dice, the clamp 165 is tightened on the support element 105. Particularly, the action of axial traction, transversal to the clamp 165, exerted by the heads of the screws 195 and by the respective dice on the wings 175a and 175b causes the appendixes 180a and 180b to behave like jaws, clamping therebetween the support element 105. Particularly, the peculiar shape of the appendixes 180a and 180b, causes a combination of tilted planes with the bent edges 140a and 140b of the support element 105, that transforms the action of traction exerted by the screws 195 into an action of transversal compression on the support element 105; this latter is therefore biased, urged toward the back wall 170 of the clamp 165.

In this way, when the tightening of the dice is completed, the back wall 135 of the support element 105 is brought into abutment against the support bar 160, as visible in FIG. 2B, FIG. 4 and FIG. 5, while the bar 160 abuts against the edge of the slots 185 located on the side of the back wall 170 of the clamp 135.

Thanks to this, it is possible to exploit the significant rigidity of the bar 160 to confer resistance against twisting and side bending of the guide 100. Moreover, for the mounting of the guide to the support bar it is not necessary to make holes in the latter, neither the use of particular tools is required.

The particular shape of the support element 105 contributes to confer to the guide a high rigidity against bending. In fact, the "double C" profile allows to increase the distance between the coupling area with the idle rollers modules (appendixes 155a and 155b), where in use the transversal stresses that the guide receives from the transported articles are exerted, and the back wall 135. In other words, the support element 105 is shaped so that a coupling portion thereof with the elements of engagement with the transported articles is spaced apart, in a direction transversal to the direction in which the transport path extends, compared to said first and second edges intended to be clamped by said clamp appendixes. Thanks to this, the moment of inertia of the structure is increased.

The guide comprises a clamp 165 with clamping appendixes 180a, 180b for cooperation with a double-C profile guide element 105. Elements of engagement such as rollers 120 can be coupled to one C-bent between the coupling portion 155a, 155b. The guide element 105 can be clamped in the clamp 165. By providing a double clamp mechanism comprising the clamp 165 and the clamp 105, the bending stiffness of the guide can be increased. By providing tightening means 195 for urging the clamping appendixes towards each other, the bending stiffness of the guide can be further increased.

Figure 7:
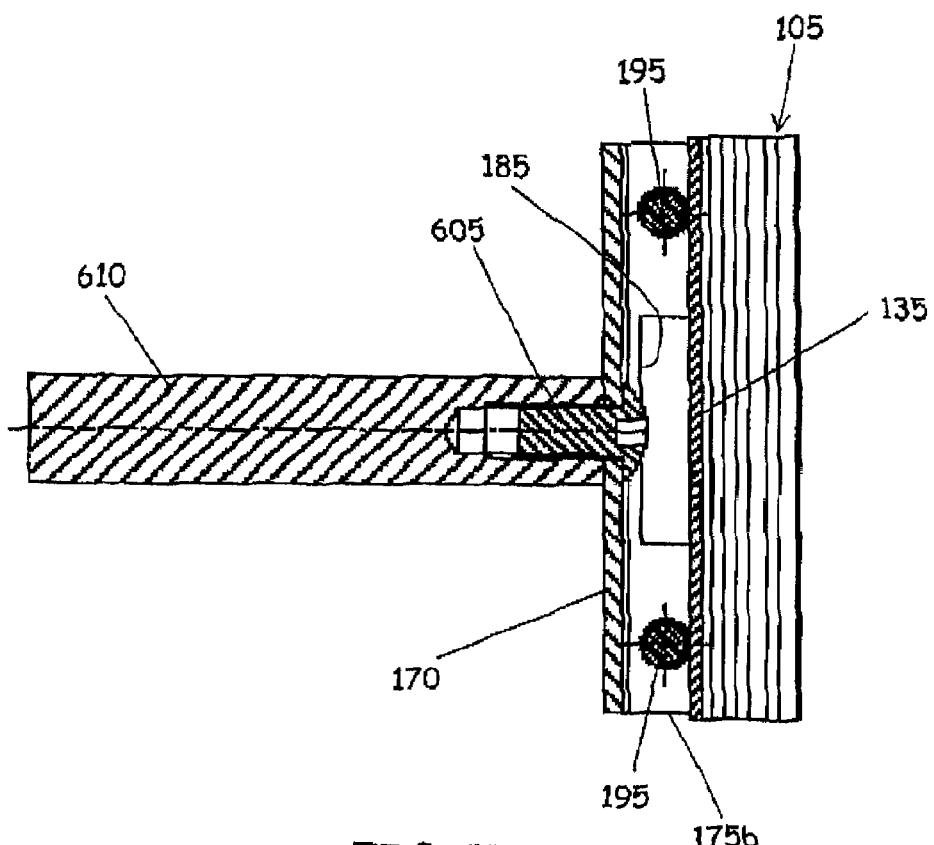
FIG. 7 is a sectional view according to the plane VII-VII of FIG. 6.

The support structure of the guide according to the present invention is not limited to the use in combination with vertical support bars as the bar 160 of the preceding figures, being as well exploitable for the support of guides to support bars extending horizontally, as shown in FIGS. 6 and 7 (in which for simplicity the idle rollers elements 110 are omitted). In this case, it is possible to exploit the hole 197 provided in the back wall 170 of the clamp 165 for mounting, by means of a screw 605, the clamp 165 to the end of a horizontal support bar 610, in turn attached to a frame of the conveyor of articles. Also in this case, the action of traction exerted by the screws 195 is transformed, by the combination of tilted planes of the appendixes 180a and 180b of the clamp 165 and of the bent edges 140a and 140b of the support element 105, into an action of transversal compression on the support element 105, that is thus urged toward the back wall 170 of the clamp 165. Once the mounting is completed, the back wall 135 of the support element 105 abuts against the stems of the screws 195 that are used to tighten the clamp 165 on the support element 105. The structure thus obtained has nonetheless a good rigidity, ensured by the clamp 165.

In the embodiment previously described, the support bar 160 has a generically rectangular or square cross-section, or however, also in the case the support bar has a generically cylindrical cross-section, substantially planar portions are preferably formed thereon, for instance by milling, intended to the abutment of the back wall of the support element.

Figure 8:
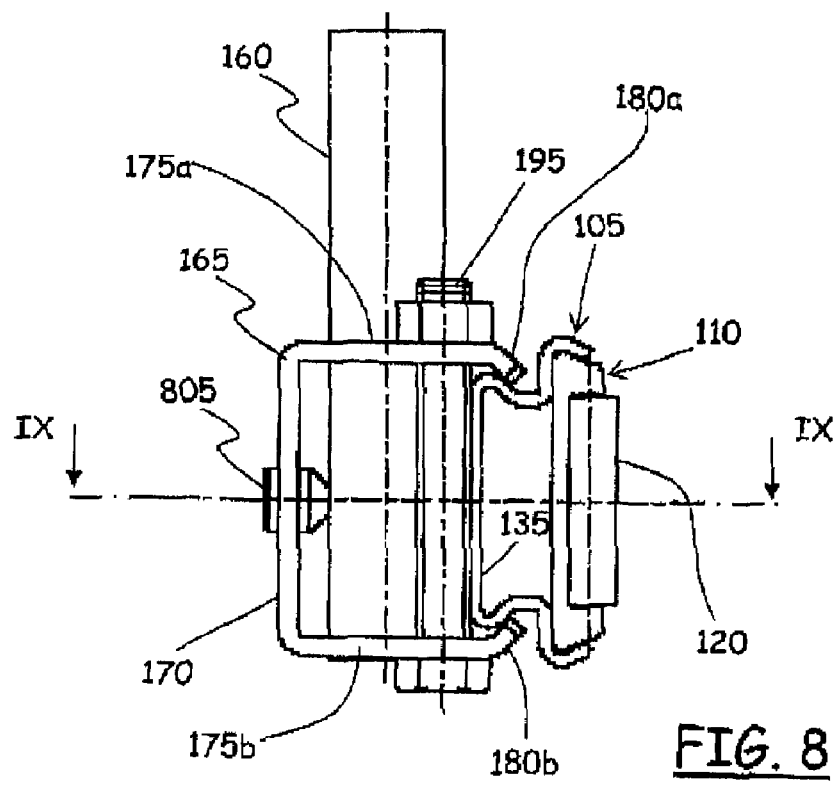
FIG. 8 shows, in a view similar to those of FIGS. 2A, 2B and 6, a guide according to a variant of the first embodiment.
Figure 9:
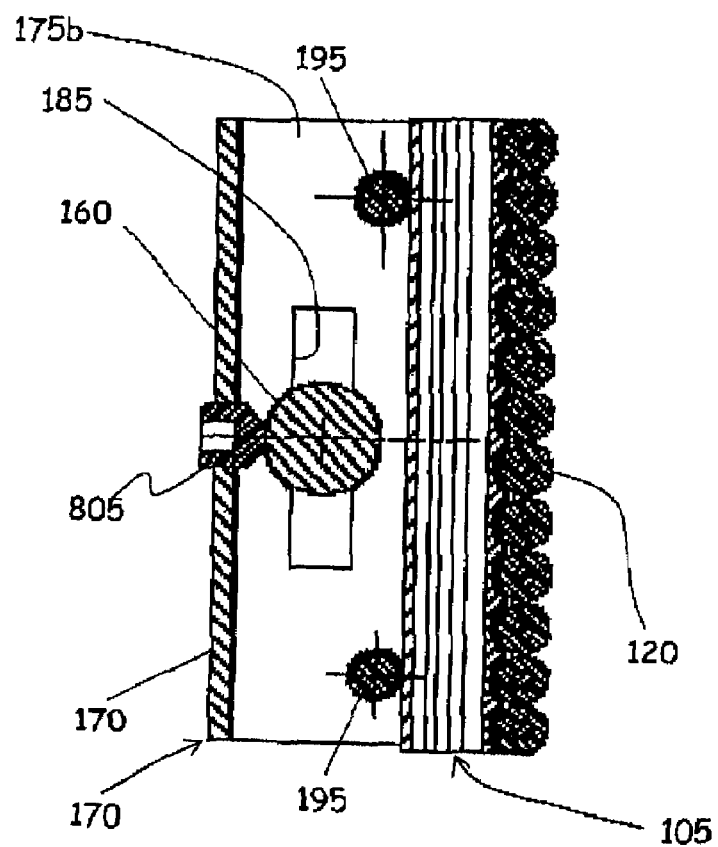
FIG. 9 is a sectional view according to the plane IX-IX of FIG. 8.

In an alternative embodiment of the present invention, shown in FIG. 8 and FIG. 9, the arrangement of the slots 185 along the wings 180a and 180b of the clamp 165 can be displaced toward the back wall 170 compared to the first embodiment described, so that the back wall 135 of the support element 105, when the latter is clamped by the clamp 165, abuts against the stems of the screws 195, rather than the support bar 160. This arrangement is for instance preferable if the bar 160 does not have rectangular or square cross section, or if it in general does not have a planar or substantially planar portion of sufficient width, as for instance in the case, shown in FIG. 8 and FIG. 9, the bar 160 has a circular cross section (it is intended that the slots 185 are in such case shaped and sized so as to allow the passage of such a bar). For the tightening of the clamp 165 on the bar 160 a wheat 805 or a screw or other thrust means can be employed, to be inserted into the through hole 197 provided in the back wall 170 of the clamp 165.

In FIG. 10 and FIG. 11 there is shown a further embodiment of the present invention, similar to that shown in FIG. 1, in which, for the support of the idle rollers modules 110, a support element 1005 is used that is shaped in different way compared to the support element 105. Particularly, the support element 1005 has a transversal section generically as a "single C", and more particularly it includes a substantially planar back wall 1035, and two appendixes 1055a and 1055b bent on the same side.

In a totally similar way to the first embodiment described, for the mounting of the guide 100 the desired number of idle rollers modules 110 is inserted into the support element 1005; the clamp 165 is inserted on the bar 160, exploiting its two slots 185, and the support element 1005 is then inserted from the back into the clamp 165. The screws 195 are inserted into the holes 190, and, by tightening the screws exploiting threaded dice, the clamp 165 is tightened on the support element 1005. The action of axial traction exerted by the heads of the screws 195 and by the respective dice on the wings 175a and 175b of the clamp 165 causes the appendixes 180a and 180b thereof to behave as jaws, clamping therebetween the appendixes 1055a and 1055b of the support element 1005, and the action of traction exerted by the screws 195 is transformed, by the combination of tilted planes of the appendixes 180a and 180b of the clamp 165 and of the appendixes 1055a and 1055b of the support element 1005, into an action of transversal compression on the support element 1005, that is urged toward the back wall 170 of the clamp 165.

In this way, when the tightening of the dice is completed, the back wall 1035 of the support element 1005 is brought into abutment against the bar 160.

In FIG. 12 and FIG. 13 a variant of the embodiment of FIG. 10 and FIG. 11 is shown, in which, similarly to what shown and described in FIG. 6 and FIG. 7, instead of a vertical support bar, the clamp 165 is mounted on the head of a horizontal bar 1210, by means of a screw 1205 inserted into the through hole 197 provided in the back wall 170 of the clamp 165. As in the case previously described, the back wall 1035 of the support element 1005 abuts against the stems of the screws 195.

Moreover, also employing the support element 1005, it is possible to obtain an assemblage to a vertical support bar in which, similarly to what described and shown in FIGS. 8 and 9, the back wall 135 of the support element 1005 abuts the stems of the screws 195, rather than the support bar.

The invention has been here described making reference to an exemplary embodiment thereof, however those skilled in the art can easily devise variants to the embodiment shown or new embodiments, for meeting contingent needs, without for this departing from the scope of protection defined by the appended claims.

For example, instead of the screws 195, other means could be used, and in general any element can be used adapted to exert an action of traction one towards the other of the two wings of the clamp.

The slots provided in the middle between the two wings of the clamp could have a greater longitudinal extension compared to the width of the bar to which it has to be mounted, so as to allow the tilted assemblage with respect to the bar; this can be useful to realize guides for non-planar segments of the articles transport path.

The appendixes 180a and 180b of ends of the wings 175a and 175b of the clamp can also be constituted by an edge bent as an arc of circle, being sufficient that the side wings of the jaws are shaped so as to transmit to the support element of the idle rollers modules an action with a vertical component correspondent to the action of the screws 195 that, thanks to of the tilted contact plane, develops a horizontal component necessary to the action of compression of the back wall of the support element on the bar or on the screws.

The use of the clamp 165 for the mounting of the guide to the frame of the conveyor is merely exemplary, other solutions could be adopted, possibly, but not limitatively, also capable of coupling to the male coupling profile of the support element 105, and particularly to the bent edges 140a, 140b of the back wall 135 thereof, so that, by tightening the mounting elements on the support element, a urging action toward the back wall is determined.

Moreover, although described making reference to a roller guide, nothing prevents from applying the present invention to static guides, without roller elements for the contact with the transported articles, and for instance formed of extruded profiled elements made of metal or synthetic material. For instance, although not limitatively, the support element could be intended to support elements of engagement with the transported articles, such as bars, tubular elements or profiled elements extended longitudinally, or the support element could be shaped so as to form the element of engagement with the transported articles.

I claim:

1. A guide for a conveyor of articles, said guide comprising:
   a guide element elongated in a longitudinal direction and intended in use to be arranged along a transport path of a conveyor of articles for containment and/or routing of transported articles, said guide element comprising a substantially planar portion and first and second edges opposed to each other in a transversal direction transversal to said longitudinal direction;
   a clamp associable to said guide element, said clamp comprising a back portion and two clamp appendixes opposed to each other in said transversal direction and adapted to clamp said guide element along said first and second edges, said clamp being adapted for coupling to a support bar of the conveyor of articles intended to support the guide element to a frame of the conveyor, said clamp including a pair of slots opposed to each other in said transversal direction and adapted to allow sliding insertion of the clamp on said support bar;
   tightening means associable to said clamp and actuatable to exert an action of traction of the clamp appendixes to urge them one towards the other in said transversal direction, so as to tighten said clamp appendixes against said first and second edges of the guide element, said tightening means including at least one of a screw and a connecting rod, and said slots are arranged in such a way that said action of urging of the guide element toward the back portion of said clamp causes the abutment of the back wall of the guide element against said at least one of a screw and a connecting rod;
   wherein said clamp appendixes of the clamp and said first and second edges of the guide element are shaped in such way as to transform at least partly said action of traction exerted by said tightening means on the clamp appendixes into an action of urging of the guide element toward the back portion of the clamp, said action of urging being adapted to bring the planar portion of the guide element in abutment against at least one among said support bar or said tightening means.

2. The guide according to claim 1, wherein said slots are arranged in such a way that said action of urging of the guide element toward the back portion of said clamp causes the abutment of the substantially planar portion of the guide element against said support bar when the clamp is inserted on the support bar.

3. The guide according claim 1, wherein said clamp includes means for mounting thereof to an end head of said support bar.

4. The guide according claim 1, in which said guide element includes a support element adapted to support elements of engagement with the transported articles.

5. The guide according to claim 4, in which said elements of engagement with the transported articles include idle rolling elements.

6. The guide according to claim 5, in which said elements of engagement include at least one idle rollers module, comprising in turn a frame for supporting idle roller elements, said frame being adapted to support, in longitudinal succession, a plurality of stems, each of which carries in a freely rotatable way one or more idle roller elements that, in use, are exposed to contact by the transported articles.

7. The guide according to claim 4, in which said elements of engagement with the transported articles include extruded elements with substantially smooth surface.

8. The guide according to claim 4, in which said support element is shaped so as to have a coupling portion with the elements of engagement with the transported articles that is spaced apart, in a second transversal direction, transversal to said longitudinal direction and said first transversal direction, with respect to said first and second edges intended to be clamped by said clamp appendixes.

9. The guide according to claim 8, in which said support element includes a back wall, ending with a pair of edges bent toward a middle of the back wall and forming said first and second edges intended to the engagement with the clamp appendixes of the clamp, said pair of edges being joined to respective portions of wall parallel to said back wall and ending in respective appendixes bent towards said middle, forming a female coupling profile intended to retain said elements of engagement with the transported articles.

10. The guide according to claim 9, in which first and second edges of the support element define a male coupling profile, generically swallowtail shaped, for the coupling with the clamp.

11. A guide for a conveyor of articles, said guide comprising:
  an elongated guide element extending in a longitudinal direction and having a substantially planar portion and first and second edges opposed to each other in a transversal direction transversal to said longitudinal direction;
  a clamp clamping onto said first and second edges of said guide element, said clamp including a back portion and two clamp appendixes opposed to each other in said transversal direction, said appendixes being movable between a clamp position and an unclamp position by exerting an action of traction on said appendixes, wherein said action of traction urges said appendixes towards each other in said transversal direction, so as moves said appendixes toward said clamp position and tighten said clamp appendixes against said first and second edges of the guide element;
  tightening means which exerts the action of traction on said appendixes to urge one of said appendixes towards the other of said appendixes in said transversal direction, so as to tighten said clamp appendixes against said first and second edges of the guide element;
  wherein said clamp appendixes of the clamp and said first and second edges of the guide element are shaped in such way as to transform at least partly said action of traction exerted on the clamp appendixes into an action of urging of the guide element toward the back portion of the clamp, said action of urging being adapted to bring the planar portion of the guide element in abutment against at least one among said support bar or said tightening means.

12. The guide according to claim 11, in which said clamp is fixed relative to a support bar of the conveyor of articles, said support bar fixing the guide element relative to a frame of the conveyor.

13. The guide according to claim 12, wherein said clamp includes a pair of slots opposed to each other in said transversal direction and adapted to allow sliding insertion of the clamp on said support bar.

14. The guide according to claim 12, wherein said slots are arranged in such a way that said action of urging of the guide element toward the back portion of said clamp causes the abutment of the substantially planar portion of the guide element against said support bar when the clamp is inserted on the support bar.

15. The guide according claim 12, wherein said clamp is mountable to an end head of said support bar.

16. The guide according claim 11, in which said guide element includes a support element adapted to support elements of engagement with transported articles.

17. A guide for a conveyor of articles, said guide comprising:
  a support element having a first edge and a second edge joined by a back wall, each of said first edge and said second edge including a portion defining an angle with said back wall;
  a clamp retaining said support element between a first wing and a second wing joined by a back wall, said first wing including an appendix engaging said portion of said first edge, and said second wing including an appendix engaging said portion of said second edge; and
  tightening means extending between said first wing and said second wing, wherein tightening said tightening means engages said appendix of said first wing with said portion of said first edge and said appendix of said second wing with said portion of said second edge, wherein engagement of said appendix of said first wing with said portion of said first edge and said appendix of said second wing with said portion of said second edge urges said back wall of said support element toward said back wall of said clamp.

18. The guide as in claim 17, in which tightening said tightening means draws said first wing and second wing towards each other.

19. The guide as in claim 17, in which each of said appendices are bent toward said support element.

20. The guide as in claim 17, in which a roller-carrying frame is retained by said support element between said first edge and second edge.

21. A guide for a conveyor of articles, said guide comprising:
  a guide element elongated in a longitudinal direction and intended in use to be arranged along a transport path of a conveyor of articles for containment and/or routing of transported articles, said guide element comprising a substantially planar portion and first and second edges opposed to each other in a transversal direction transversal to said longitudinal direction;
  a clamp associable to said guide element, said clamp comprising a back portion and two clamp appendixes opposed to each other in said transversal direction and adapted to clamp said guide element along said first and second edges, said clamp being adapted for coupling to a support bar of the conveyor of articles intended to support the guide element to a frame of the conveyor;

tightening means associable to said clamp and actuatable to exert an action of traction of the clamp appendixes to urge them one towards the other in said transversal direction, so as to tighten said clamp appendixes against said first and second edges of the guide element, said tightening means being arranged in said transversal direction;

wherein said clamp appendixes of the clamp and said first and second edges of the guide element are shaped in such way as to transform at least partly said action of traction exerted by said tightening means on the clamp appendixes into an action of urging of the guide element toward the back portion of the clamp, said action of urging being adapted to bring the planar portion of the guide element in abutment against at least one among said support bar or said tightening means.

* * * * *